Jan. 30, 1962 S. B. WHITTIER 3,018,707
PHOTOGRAPHIC LIGHTING APPARATUS
Filed Aug. 7, 1958 3 Sheets-Sheet 1
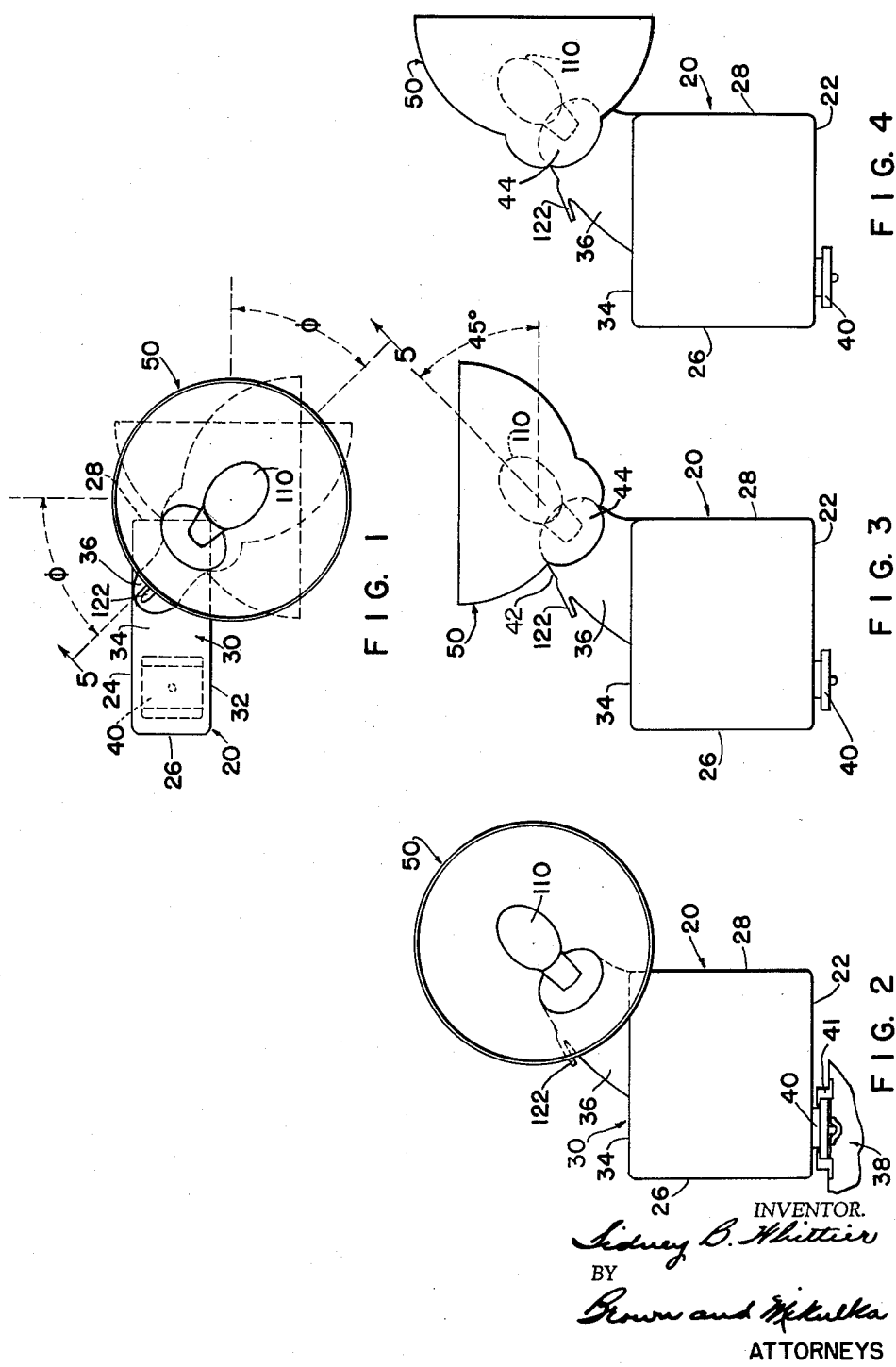
INVENTOR.
Sidney B. Whittier
BY
Brown and Mikulka
ATTORNEYS Jan. 30, 1962 S. B. WHITTIER 3,018,707
PHOTOGRAPHIC LIGHTING APPARATUS
Filed Aug. 7, 1958 3 Sheets-Sheet 3

INVENTOR.
Sidney B. Whittier
BY
Brown and Mikulka
ATTORNEYS

United States Patent Office 3,018,707
Patented Jan. 30, 1962

3,018,707
PHOTOGRAPHIC LIGHTING APPARATUS
Sidney B. Whittier, Concord, Mass., assignor to Polaroid Corporation, Cambridge, Mass., a corporation of Delaware
Filed Aug. 7, 1958, Ser. No. 753,784
22 Claims. (Cl. 95—11.5)

This invention relates to illuminating apparatus and more particularly to lighting apparatus for use in photography.

In the use of artificial lighting for photography, particularly in flash photography, it has become a common practice to reflect or "bounce" a flash of light from a surface, such as a ceiling, adjacent the subject of the photograph. This procedure often provides a photograph having greater depth and less undesirable contrast than a picture taken with a flash aimed directly at the subject. The present invention concerns a lighting apparatus adapted for mounting upon a camera and which embodies a novel means for easily and simply changing the direction of the light with respect to the position at which the camera is held without any necessity for dismounting the apparatus or employing an adapting mechanism.

A principal object of the present invention therefore is to provide such a lighting apparatus mountable upon a photographic device having a primary optical axis, said apparatus including a reflecting means pivotable in a plane to a plurality of positions for directing light in a corresponding plurality of mutually perpendicular directions with respect to said optical axis.

Another object is to provide a lamp for mounting upon a camera having a primary optical axis, said lamp comprising a reflecting means rotatable about a single axis to at least three positions including a first position wherein said reflecting means directs light in a first direction approximately parallel with said optical axis, a second position wherein said reflecting means directs said light in a second direction approximately perpendicularly to said optical axis, and a third position wherein said reflecting means directs said light in a third direction approximately perpendicularly to both said optical axis and said second direction.

Other objects are to provide such a lamp comprising an approximately bowl-shaped reflector disposed for rotation about a single axis through an arc of approximately 360° to traverse said three positions; to provide such a lamp from which an operator, without altering the mounting of said lamp, may obtain direct lighting of a photographic subject or obtain "bounce" lighting whether the camera is held vertically or horizontally.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a schematic plan view of a device embodying the invention and showing a reflecting means in various positions;

FIG. 2 is a schematic front elevation showing the device of FIG. 1 with the reflecting means in a first or forward position;

FIG. 3 is a schematic front elevation showing the device of FIG. 1 with the reflecting means in a second or upward position;

FIG. 4 is a schematic front elevation showing the device of FIG. 1 with the reflecting means in a third or sideways position;

Figure 5:
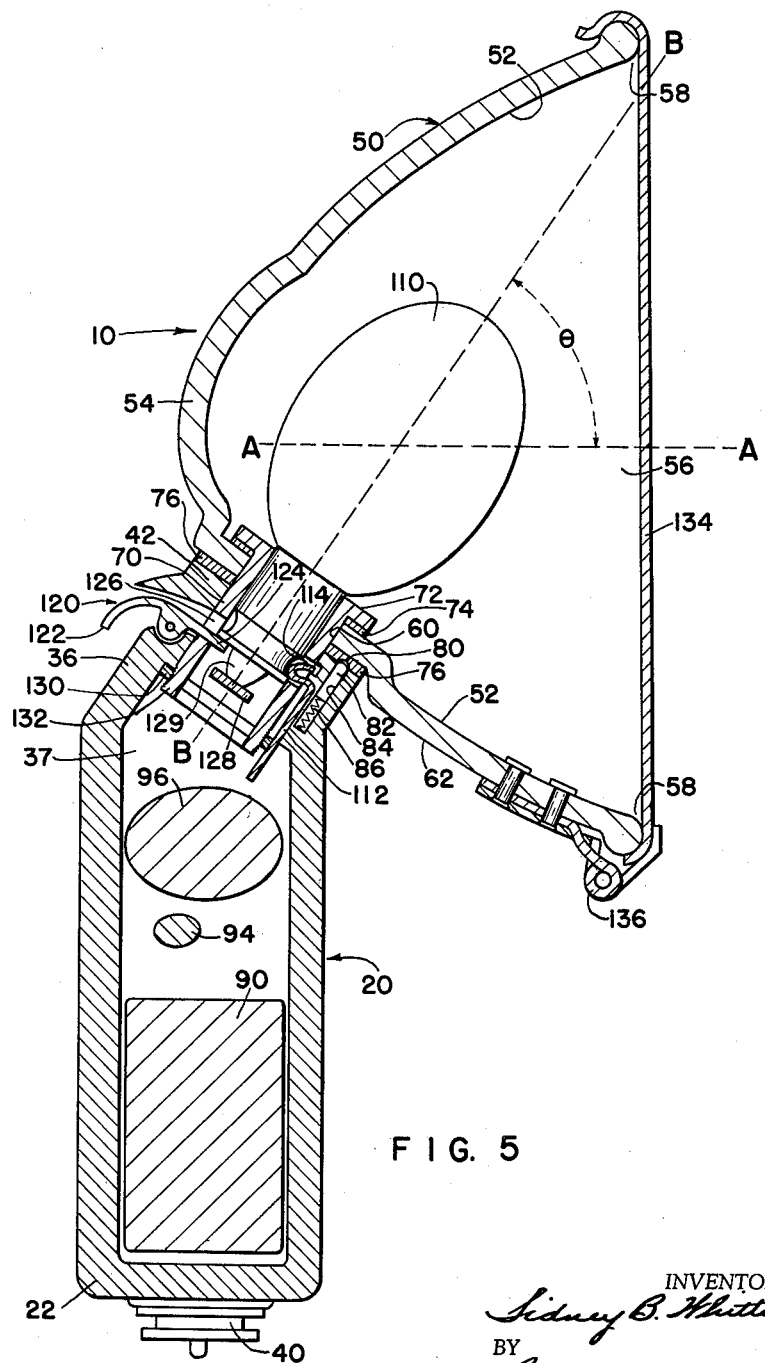
FIG. 5 is a schematic cross-sectional view of the device of FIG. 1 taken along the line 5—5.

This invention contemplates a lighting apparatus, particularly of the flashgun type, comprising a housing or casing for supporting and protecting the electrical elements of the apparatus, and means for so mounting the apparatus upon a camera that the housing is in a substantially fixed alignment relative generally to the field of view and particularly to the optical axis of the objective lens of the camera. Generally, a flashgun is so aligned that the field of view of the camera is illuminated when the gun is fired. To provide for "bounce lighting" the gun must usually be remounted upon means such as a "bounce light" bracket. Even with a substantially fixed alignment of the housing of this invention, there is no need for remounting, the invention including a reflecting means mounted upon said housing means and being movable to a plurality of positions for directing light in different directions without altering the alignment of the housing.

There is shown in FIGS. 1 through 5 an illuminating lamp such as a flashgun generally indicated by the reference numeral 10 and comprising a hollow housing means or casing 20 for enclosing and supporting electrical elements of the gun, the casing having a bottom 22, a back 24, two side portions 26 and 28, and a top 30. A removable cover member, as for example a substantially planar front portion 32, is employed in conjunction with housing 20 to close the housing and is preferably removable to gain access to the interior of the housing for replacing electrical components when necessary. Top 30 includes a substantially planar portion 34 disposed perpendicularly to the plane of front portion 32, and an upstanding or projecting portion 36, the latter comprising a means for supporting a reflecting means in a predetermined angular relationship to the housing. Housing 20 may be formed of any suitable material, preferably of an electrically non-conducting substance such as a phenolic resin, vulcanized rubber or the like.

As a means for mounting housing 20 upon a camera, a portion of the latter being shown in FIG. 2 at 38, there is provided, for example, a mounting foot or jack 40 which is disposed exteriorly of housing 20 and on the bottom wall thereof. Jack 40 is so disposed with respect to housing 20 that the insertion of the jack into mounting clip 41, or other similar means for holding a flashgun upon a camera, firmly and releasably retains housing 20 in a substantially fixed relationship to the camera. In the form shown, the relationship is such that the plane of front portion 32 is disposed approximately perpendicularly to the optical axis of the camera, and the plane of planar portion 34 of top 30 is therefore approximately parallel with the optical axis of the camera objective. Jack 40 may comprise one of the mounting feet known in the art and preferably comprises a foot such as shown in the copending U.S. application Serial No. 743,657, filed on June 23, 1958, by Edison R. Brandt.

A means, such as upstanding portion 36, is provided for supporting a reflecting means in operative relation to the camera. Upstanding portion 36, in the form shown in FIG. 5, comprises a projecting member having a hollow cylindrical interior 37 and a cylindrical axis B—B disposed in a predetermined angular relationship with respect to the optical axis of the camera to provide a pivotal axis for a reflecting means such that the reflecting means may be rotated to direct light in a plurality of directions. The predetermined relationship of the axis B—B of upstanding portion 36 and the optical axis of the camera objective may be described by referring to three planes of reference: a first plane, which for example may comprise the plane of front portion 32, a second plane, which may comprise the plane of planar portion 34 and a third plane (shown as A—A in FIG. 5), which may comprise a plane perpendicular to the first and second planes and parallel with the optical axis of the camera objective. In the preferred embodiment, axis B—B then forms angles (indicated as $\phi$ in FIG. 1) of approximately 45° with both the first and third planes and forms an angle (indicated as $\theta$ in FIG. 5) of approximately 55° with respect to the second plane. It should be noted that because FIGS. 1 through 4 show projections of the upstanding portion upon a plane, the latter angle appears as 45°, as for example in FIG. 3. Upstanding portion 36 extends from housing 20 adjacently planar portion 34, and includes extremity 42 which is provided with a substantially planar sliding surface 44 disposed about the hollow interior of portion 36 and approximately perpendicularly to axis B—B.

Figure 6:
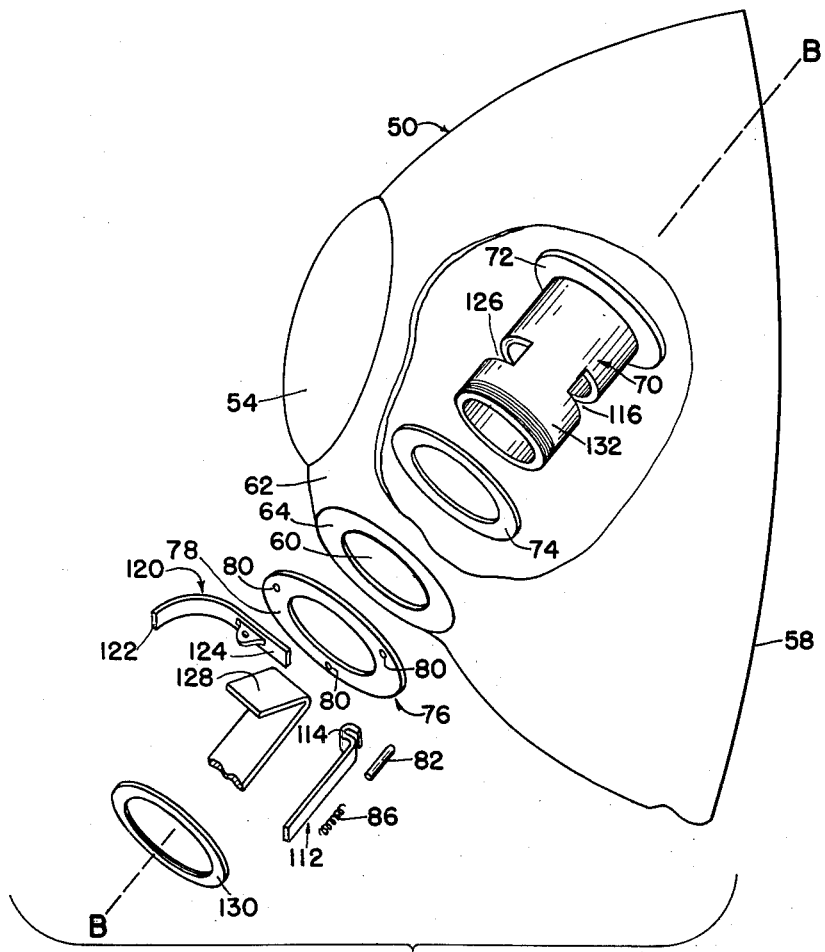
FIG. 6 is an exploded perspective view of certain parts of the device of FIG. 1.

As a means for reflecting and directing light, there is provided a reflector 50 which may be semi-spherical, conoidal or the like and in the preferred embodiment comprises a reflector having a reflecting inner surface 52 disposed within a roughly bowl-shaped configuration having a vertex 54 at one end and an opening 56 at the other end, the periphery 58 of opening 56 preferably lying within a single plane. Disposed adjacent vertex 54 and to one side thereof is a means such as circular aperture 60, the center of which provides a pivotal axis for reflector 50, aperture 60 being so disposed that rotation of reflector 50 about the pivotal axis through aperture 60 may move the plane of periphery 58 through three mutually perpendicular positions. Aperture 60 is provided about the periphery thereof adjacent external surface 62 of reflector 50 with a substantially planar surface 64 as seen in FIG. 6.

Reflector 50 is so mounted upon upstanding portion 36 that planar surface 64 of reflector 50 and sliding surface 44 of upstanding portion 36 are adjacently parallel with one another, aperture 60 being so aligned with the hollow interior 37 of upstanding portion 36 that the pivotal axis of the reflector is colinear with axis B—B.

As a means for retaining reflector 50 in rotatable relation to sliding surface 44 of upstanding portion 36, there is provided a member such as bulb socket 70 which is fitted to the cylindrical interior 37 of upstanding portion 36 and extends therefrom through aperture 60 and into the interior of reflector 50, bulb socket 70 being preferably provided with a flange 72 about that end of the socket which extends into reflector 50. In order to provide for smooth and easy rotatability of reflector 50 about bulb socket 70 there is provided a bearing means which, for example, may comprise a washer-like member 74 disposed about bulb socket 70 between and in sliding engagement with both flange 72 and inner surface 52 of reflector 50. Washer 74 may be formed of any suitable material such as bearing metal or preferably nylon or a similar plastic.

Also disposed about bulb socket 70 between planar surface 64 of reflector 50 and sliding surface 44 of upstanding portion 36 and affixed to planar surface 64 by suitable means such as cement or rivets, is a means for providing a bearing surface and also comprising a portion of a detent device for releasably retaining reflector 50 in a predetermined rotational position with respect to upstanding portion 36. Such a means may comprise a washer-like element 76 composed of a suitable material, preferably metal. Element 76 is provided upon its bearing surface 78 with a plurality of engagement portions such as indentations 80 disposed at predetermined positions; the preferred embodiment including three such indentations located at 120° from one another and equidistant from the center of element 76.

The detent means also comprises a movable member which, in the form shown, comprises a pin 82 disposed in channel 84 in upstanding portion 36. Pin 82 is biased by a resilient means such as spring 86 toward element 76. Channel 84 is so disposed in upstanding portion 36 that one extremity of pin 82 is releasably engageable with indentations 80 in element 76 at rotational positions of reflector 50 predetermined by the location of the indentations.

Figure 7:
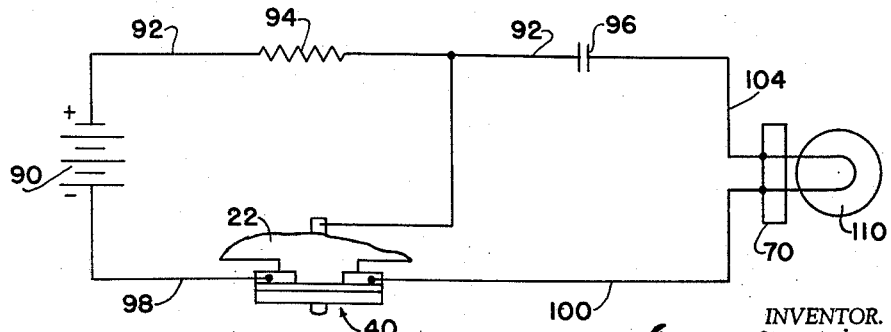
FIG. 7 is a diagrammatic circuit showing one embodiment of the electrical elements of the device of FIG. 1.

Casing 20 is adapted to enclose and support wiring and other elements necessary to provide a power supply means such as dry-cell batteries, a battery-capacitor unit or the like, a preferred embodiment of a circuit for energizing the lamp being shown in FIG. 7. The circuit, for example, comprises a battery 90, the positive terminal of which is connected by lead 92 through resistance 94 to the positive plate of a condenser 96. The negative side of the battery is connected by lead 98 to one side of a mounting foot such as jack 40. The other side of jack 40 is connected by means such as lead 100 to one contact for a bulb-holding means such as socket 70 while the other contact for socket 70 is connected by lead 104 to the negative plate of condenser 96. Lead 106 is connected across the circuit joining the circuit between resistance 94 and condenser 96, lead 106 being connected to a third element of the foot 40, the circuit being connected to a flash-synchronizing, shutter-operated switch (not shown) in camera 38 by insertion of jack 40 into mounting clip 41 of the camera. It should be noted that the particular circuit disclosed herein forms no part of the invention and is described for purposes of illustration only. Such a circuit is shown in detail in U.S. Patent No. 2,646,672, for example, and comprises one of the many circuits which may be used with the invention.

As a means for retaining a light-producing source such as a flashbulb 110 within bulb socket 70 there is provided, in the form shown, a resilient element such as spring 112, having a portion 114 shaped for resiliently engaging a portion of the base of a bulb upon insertion of said bulb into the socket, the other end of spring 112 extending from upstanding portion 36 into the interior of housing 20 and providing a means for electrically connecting one terminal of bulb 110 with the electrical elements of the circuit heretofore described. Spring 112 is preferably mounted interiorly of upstanding portion 36, portion 114 extending through an opening in a side socket 70.

As a means for ejecting bulb 110 (for instance, when the bulb has been expended), there is provided a lever indicated generally at 120 and mounted upon upstanding portion 36 for pivotal movement. Lever 120 is approximately centrally pivoted and one extremity of lever 122 is disposed exteriorly of upstanding portion 36 for providing a manually operable pressure surface. The other extremity 124 of lever 120 extends interiorly of upstanding portion 36 and through another opening 126 in a side of bulb socket 70 such that when bulb 110 is inserted into the bulb socket, a portion of the base of said bulb is engageable upon extremity 124.

A means such as leaf spring 128, for providing an electrical connection to the base terminal 129 of bulb 110, is so disposed within upstanding portion 36 as to be engaged by terminal 129 upon insertion of bulb 110 into socket 70. Spring 128 also comprises a means for providing a resilient force for ejecting bulb 110 from the bulb socket upon actuation of lever 120.

As a means for retaining bulb socket 70 firmly within the cylindrical interior of upstanding portion 36 and for retaining reflector 50 in sliding engagement with upstanding portion 36, there is provided, in the form shown, lock ring 130 which is engageable about extremity 132 of socket 70 which extends interiorly of casing 20. Both the inner periphery of ring 130 and the outer periphery of extremity 132 of bulb socket 70 may be threaded so that ring 130 is readily fitted to extremity 132 and rotatable for axially moving the ring into engagement with a portion or abutment in the interior of upstanding portion 36.

As a means for preventing injury to an operator of the flashgun from possible explosions or implosions of bulb 110, reflector 50 is provided with a transparent shield or cover 134 disposed over opening 56, cover 134 being mounted on reflector 50 to provide ready access to the interior of the reflector. In the preferred embodiment, cover 134 is pivotally mounted for movement about hinge 136 through an arc of not more than 60° so that should the bulb shatter while the reflector is open the fragments will be deflected away from the reflecting axis of the reflector. Yet another example of a cover shield would comprise a shield which is operatively connected with the ejecting mechanism such as lever 120 such that rotation of cover 134 from closed position to open position automatically ejects bulb 110. Additionally, hinge 136, for example, may be so constructed as to comprise a portion of a switching means for disconnecting the circuit to the bulb and for rendering the circuit inoperative when the cover shield is in an open position, thereby preventing accidental discharge while an operator has access to the interior of the reflector.

In operation, flashgun 10 is mounted upon camera 38 by insertion of jack 40 in clip 41, such insertion preferably closing the circuit from charging condenser 96 and also introducing the flash-synchronizing switch of camera 38 into the flashgun circuit such that operation of the camera shutter will synchronously fire bulb 110. The insertion of jack 40 into mounting clip 41 also aligns the flashgun such that the plane of the periphery 58 of reflector 50 is, for instance, perpendicular to the optic axis of the camera objective and hence in the forward position as shown in FIG. 2, the gun being thereby positioned to illuminate the field of view of the camera. Rotation by the operator of reflector 50 about axis B—B upon the bearing surfaces provided by washer 74 and element 76 moves the reflector such that after rotation of 120° the plane of the periphery of opening 56 of reflector 50 is at a right angle to both the optical axis of the camera, and to the plane of periphery 58 when in the forward position, as for instance, the upward position shown in FIG. 3 wherein an area above the operator is illuminable. Continued rotation of the reflector about axis B—B through another 120° angle moves the reflector such that the plane of the periphery of the reflector is now at a right angle to both the upward position and the optical axis, for example, in the sideways position as shown in FIG. 4 wherein an area to one side of the operator may be illuminated. Indentations 80 in element 76 are so disposed with respect to pin 82 that when reflector 50 is in any one of the aforesaid positions, pin 82 is in engagement with a respective indentation for releasably retaining the reflector in said one of the aforesaid positions.

Pressure manually applied to lever 120 by an operator forces bulb 110, which is normally retained by spring 112 in socket 70 axially along the socket, releasing the bulb from engagement with the spring. When the bulb is no longer engaged, the resilient force exerted on the base thereof by leaf spring 128 ejects the bulb from the socket to a free position interiorly of reflector 50 from whence it may be removed manually, the socket being free for insertion of a new bulb.

It is to be understood that although the reflector has been described as being movable to one of three positions spaced 120° apart about a rotational axis, the reflector is movable to a plurality of positions between the three preferred positions and may be retained in any one or several positions of said plurality by appropriate positioning of additional indentations in element 76. While the reflector has been disclosed in the preferred form as pivotable about an axis disposed in a particular manner with respect to the camera, it is apparent that the angular displacement of the axis from the plane of reference may readily be modified to obtain light reflection in other pluralities of directions. It is obvious that the housing may be constructed with other configurations than as described, the planar portions of the housing being recited primarily for providing the planes of reference. Although the description heretofore made of the present invention has largely been concerned with the flashgun art, it should be noted that with minor modifications the invention is equally well adapted for use with other power and light sources, for example, an A.-C. transformer and photoflood bulbs.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A lighting apparatus comprising, in combination, a housing means mountable upon a camera having an objective lens axis, and a reflecting means mounted on said housing means for rotation with respect thereto about only a single axis for directing light in a plurality of directions each having substantially the same invariant angular relationship to said single axis, said directions including at least three directions mutually and approximately perpendicular to one another, said housing means being mountable upon said camera with said single axis inclined at a predeterminedly fixed angle to said lens axis.

2. A flashgun comprising, in combination, a housing releasably mountable upon a camera having an objective lens axis, a reflecting means mounted on said housing for rotation about only a single axis and being at a fixed angle to said axis, and a light source so associated with said reflecting means that rotation of said reflecting means relative to said housing about said single axis directs light from said light source in a plurality of directions, at least three of said directions being mutually and approximately perpendicular to one another, said housing being mountable upon said camera so that said single axis is at a predeterminedly fixed angle to said lens axis with one of said three directions being approximately parallel to said lens axis.

3. A lighting apparatus comprising, in combination, a housing, a reflector mounted upon said housing, a light source disposed within said reflector, said reflector being rotatable relative to said housing about only a single axis for directing light from said source in a plurality of directions, at least three of said directions being mutually and approximately perpendicular to one another, all of said directions being at the same invariant angle with respect to said single axis, and means for releasably mounting said housing upon a camera having an objective lens axis so that said single axis is inclined at a predeterminedly fixed angle to said lens axis with one of said three directions being approximately parallel with said lens axis.

4. A flashgun comprising, in combination, a housing mountable upon a camera having an objective lens axis, a movable approximately bowl-shaped reflector mounted upon said housing, a flashbulb disposable within said reflector, a power source enclosed within said housing for energizing said flashbulb, said reflector being rotatable relative to said housing about only a single axis for directing light from said flashbulb in a plurality of directions, said plurality of directions all being at the same invariant angle with respect to said single axis, said housing being mountable upon said camera so that said single axis is inclined at a predeterminedly fixed angle to said lens axis with one of said plurality of directions being approximately parallel with said lens axis and two other directions being approximately perpendicular to each other and to said one direction, said flashbulb being disposed upon said single axis, said reflector being rotatable through at least three positions approximately 120° apart from one another for directing said light in said one direction and said two other directions, and detent means disposed between said reflector and said housing for releasably retaining said reflector in said three positions.

5. A lighting apparatus as defined in claim 2 wherein said light source is disposed upon said single axis.

6. A lighting apparatus comprising, in combination, a housing releasably mountable upon a camera having an objective lens axis, and a reflecting means mounted upon said housing and being rotatable relative to said housing about only a single axis for directing light in a plurality of directions all of which are at substantially the same invariant angle to said single axis, said housing being releasably mountable upon said camera so that said single axis is at a predeterminedly fixed angle to said lens axis with one of said plurality of directions being approximately parallel with said lens axis and two other directions being approximately perpendicular to each other and to said one direction.

7. A lighting apparatus as defined in claim 6 including a light source associated with said reflecting means for producing said light.

8. A lighting apparatus as defined in claim 6 wherein said reflecting means comprises an approximately bowl-shaped reflector and including a light source disposed within the concavity of said reflector.

9. A lighting apparatus as defined in claim 8 wherein said light source is disposed on said single axis and adjacent one side of the apex of said reflector.

10. A lighting apparatus as defined in claim 9 wherein said light source comprises a flashbulb.

11. A lighting apparatus as defined in claim 3 wherein said reflector is approximately bowl-shaped and including a light source disposed in said reflector on said single axis to one side of the apex of said reflector, and means disposed within said housing for energizing said light source.

12. A lighting apparatus comprising, in combination, a housing means mountable upon a camera having an objective lens axis, a reflector mounted upon said housing and being rotatable relative to said housing about only a single axis, a light source disposed within said reflector on said single axis, and means for mounting said housing means upon said camera with said single axis so inclined at a fixed angle of approximately 45° to a vertical plane through said objective lens axis and at a fixed angle of approximately 55° to a horizontal plane through said objective lens axis that rotation of said reflector directs light from said source in a plurality of directions, at least three of said directions being mutually and approximately perpendicular to one another, one of said three directions being approximately parallel with said lens axis.

13. A lighting apparatus as defined in claim 3 wherein said reflector is rotatable about said single axis through at least 360° and including a detent means for so releasably retaining said reflector at positions approximately 120° from one another that said reflector directs said light in said three directions when at said positions.

14. A lighting apparatus as defined in claim 13 wherein said light source comprises a flashbulb.

15. A lighting apparatus comprising, in combination, a housing mountable upon a camera having an objective lens axis, an electrical power source enclosed within said housing, a movable light-reflecting means, a light source associated with said light-reflecting means and connectable with said power source, said reflecting means being mounted upon said housing for rotation about only a single axis for directing light in a plurality of directions, at least three of said directions being mutually and approximately perpendicular to each other, all of said plurality of directions being at the same invariant angle with respect to said single axis, said housing being mountable upon said camera with said single axis inclined in predetermined fixed acute angular relationship to said lens axis and with one of said three directions approximately parallel with said lens axis.

16. A lighting apparatus comprising, in combination, a housing releasably mountable upon a camera having an objective lens axis, a power source enclosed within said housing, a movable light-reflecting means mounted upon said housing, a light source associated with said light-reflecting means and coupled through switch means with said power source, said reflecting means being rotatable relative to said housing about a single axis for directing light in a plurality of directions, all of said plurality of directions being at the same invariant angle with respect to said single axis, said single axis being inclined at an angle to said lens axis, said plurality of directions including one direction approximately parallel with said lens axis and two other directions approximately perpendicular to each other and to said one direction, detent means for releasably retaining said reflecting means in at least one predetermined position wherein said light is directed in one of said one direction and said two other directions, said detent means comprising an element secured to and rotatable with said reflecting means about said single axis, said element being disposed between said reflecting means and said housing and having disposed thereon a plurality of engagemnt portions, a detent member mounted on said housing for movement in and out of engagement with at least one of said engagement portions, and means for moving said detent member.

17. A lighting apparatus as defined in claim 15 including a detent means for releasably retaining said reflecting means in at least one predetermined position wherein said light is directed in at least one of said one directions and said two other directions.

18. A lighting apparatus comprising, in combination, housing means mountable upon a camera having an objective lens axis, a reflector, means for mounting said reflector on said housing means for rotation of said reflector about a single axis, means for releasably mounting said housing means upon said camera with said single axis fixedly inclined in predetermined acute angular relationship with said lens axis, said reflector being so mounted that rotation thereof directs light in a plurality of directions each having substantially the same, invariant, acute, angular relationship with said single axis, at least three of said directions being mutually and approximately perpendicular to one another, one of said three directions being approximately parallel with said lens axis.

19. A lighting apparatus as defined in claim 18 wherein said angular relationship between said single axis and said directions is approximately 55°, and said angular relationship between said single axis and said lens axis is approximately 45° with respect to a first plane containing said lens axis and approximately 55° with respect to a second plane containing said lens axis, said first and second planes being normal to one another.

20. A lighting apparatus as defined in claim 18 wherein said reflecting means is rotatable about said single axis for at least 360°, and including a detent means for releasably retaining the reflecting means at positions disposed at substantially equal angles from one another about said single axis.

21. A lighting apparatus comprising, in combination, a housing having a portion including a planar sliding surface, means for releasably mounting said housing on a camera having an objective lens axis with said sliding surface inclined in predetermined acute angles to both a first plane and a second plane containing said lens axis, said first and second planes being normal to one another, a reflector for directing light in a predetermined direction relative to said reflector, a portion of said reflector having a planar surface inclined in a predetermined acute angular relationship to said direction, said reflector being mounted on said housing for rotation about an axis normal to said planar surface and with said planar surface adjacent and parallel to said sliding surface, said planar surface being located on said axis normal to said planar surface, said angles and angular relationship being so predetermined that, when said housing is mounted on said camera, rotation of said reflector positions, the latter for directing light in a plurality of directions, at least three of said directions being mutually and approximately perpendicular to one another, one of said three directions being approximately parallel with said lens axis.

22. A lighting apparatus as defined in claim 21, wherein said reflector is approximately bowl-shaped and said sliding surface lies to one side of the apex upon the exterior of said reflector.

References Cited in the file of this patent

UNITED STATES PATENTS

| | | |
|---|---|---|
| 2,345,382 | Cramer | Mar. 28, 1944 |
| 2,388,995 | Pollack | Nov. 13, 1945 |
| 2,646,672 | Fairbank | July 28, 1953 |
| 2,716,185 | Burliuk | Aug. 23, 1955 |
| 2,727,980 | Farber et al. | Dec. 20, 1955 |
| 2,776,364 | Daniels | Jan. 1, 1957 |
| 2,804,537 | Greger | Aug. 27, 1957 |
| 2,898,447 | Hanlon | Aug. 4, 1959 |

FOREIGN PATENTS

| | | |
|---|---|---|
| 373,360 | Great Britain | May 26, 1932 |